United States Patent Office 2,898,215
Patented Aug. 4, 1959

2,898,215

METHOD OF CANNING RICE

Robert E. Ferrel, Richmond, Calif., assignor to the United States of America as represented by the Secretary of Agriculture No Drawing. Application October 30, 1958
Serial No. 770,893

2 Claims. (Cl. 99—186)

(Granted under Title 35, U.S. Code (1952), sec. 266)

A non-exclusive, irrevocable, royalty-free license in the invention herein described, throughout the world for all purposes of the United States Government with the power to grant sublicenses for such purposes, is hereby granted to the Government of the United States of America.

This invention relates to methods of canning rice and the prime object of the invention is the provision of processes for preparing a canned rice product in which the individual rice grains remain separate, that is, sticking of the grains to one another and to the walls of the can in which they are packed is essentially eliminated. Further objects and advantages of the invention will be evident from the following description wherein parts and percentages are by weight unless otherwise specified.

The successful canning of rice presents several problems. Foremost among these is the problem of stickiness. Under the influence of heat, as required in canning to ensure sterility, the rice grains become sticky and gluey so that in aggravated cases the product becomes an agglomerated mass which is of no practical value. In the Roberts Patent 2,686,130 there is disclosed a process which to a substantial extent obviates the stickiness problem. In accordance with the Roberts patent, white rice is soaked in water then cooked to a limited degree, namely, until the moisture content of the rice is about 45 to 60%. This partially cooked rice is then filled into containers, the containers sealed while under high vacuum and the sealed cans subjected to a heat processing step to sterilize the containers and contents. Although the Roberts process gives results superior to prior techniques, it is not a complete answer as a certain degree of sticking is still encountered.

In accordance with the present invention, a canned rice product can be prepared which exhibits less sticking between individual grains and between grains and can walls than can be prepared by the Roberts process. The key step in accordance with the present invention involves coating the rice grains, prior to canning, with an aqueous emulsion containing an edible oil and an emulsifying agent. In this way, the individual grains are each coated with a thin, invisible, tasteless film which effectively prevents the grains from adhering to one another or to the walls of the container in which they are packed.

It is to be emphasized that in accordance with the invention, the rice is coated with oil emulsified in an aqueous vehicle containing an emulsifying agent. The application of edible oil, per se, to rice prior to canning has been suggested heretofore but yields completely unsatisfactory results. Thus when edible oil by itself is used the oil does not continuously coat the grains but exists as more or less disconnected droplets on the rice surface probably due to incompatibility of the oil with the hydrophilic surface of the rice grains. Under such conditions the grains are not protected from sticking to one another or to the walls of the container. Moreover, coating with oil, per se, yields a discolored product. The emulsion of the invention obviates these difficulties because the emulsion forms a continuous film coating about each grain due to compatibility of the hydrophilic component of the emulsifier with the hydrophilic surface of the rice. In this continuous coating the oily material is oriented at the outer portion of the coating with the hydrophobic-hydrophilic structure of the emulsion acting as a bridge or bond between the oil and the rice surface. Under these conditions stickiness is obviated and discoloration does not occur. Moreover, regardless of any theoretical considerations, it has been found by actual test that the emulsion of the invention affords successful elimination of stickiness whereas application of oil per se yields completely unsatisfactory results.

As noted hereinabove, the objects of the invention are attained by coating the rice prior to canning with an aqueous emulsion containing an edible oil and an emulsifying agent. For best results the emulsion is applied to partially cooked rice before it is placed in the cans. (Details on preparation of the partially cooked rice are set forth below.) The coating may be performed in any of the usual methods generally suitable for coating particulate material with liquids. For example, the rice may be immersed in a pool of the emulsion, then removed and allowed to drain on a screen. In the alternative, the emulsion may be sprayed onto the rice. To attain uniform coating the rice may be tumbled in a rotating drum while contacted with the spray of emulsion. The oil in the emulsion may be any edible oil, typical examples being rice oil, safflower oil, cottonseed oil, peanut oil, corn oil, coconut oil, sesame oil, olive oil, soybean oil, butter oil and the like. The amount of oil in the emulsion is not critical and may be varied from about 1 to 10%, by weight. In addition to oil and water the emulsion contains an emulsifying agent. The chemical nature of the emulsifying agent is of no moment to the operativeness of the process as long as it has the ability to emulsify the oil and water. Typical agents which may be employed are listed below. The proportion of emulsifier may be varied depending on the efficacy of the selected agent. Thus, enough of the emulsifier is employed to provide a stable oil emulsion. The proportion to achieve this result can be easily determined by conducting trials with varying proportions of emulsifier. In general, the concentration of emulsifier may range about from 0.1 to 2 percent.

As noted hereinabove, an emulsifying agent is incorporated with the edible oil and water to produce an emulsion. The chemical nature of the emulsifying agent is of no concern to the operativeness of the process as long as the agent has the ability to emulsify oil and water. A multitude of such agents are known in the art and the invention encompasses the use of any of them. Typical examples of classes of emulsifying agents and individual agents which may be used are listed below:

Fatty acid monoesters of inner ethers of hexitols, the fatty acids containing at least six carbon atoms. Illustrative of this class are sorbitan monolaurate, sorbitan monomyristate, sorbitan monopalmitate, sorbitan monostearate, sorbitan monooleate, and sorbitan monolinoleate. The corresponding fatty acid esters of mannitan may also be used.

Condensation products of ethylene oxide with sorbitan or mannitan fatty acid esters. Typical among these compounds are ethylene oxide condensates of sorbitan oleate-laurate, sorbitan dioleate, sorbitan trioleate, sorbitan monolaurate, sorbitan monomyristate, sorbitan monopalmitate, sorbitan monostearate, sorbitan monooleate, and the like. These condensates may contain anywhere from 6 to 60 moles of ethylene oxide per mole or sorbitan monoester.

Condensation products of ethylene oxide with long-chain carboxylic acids, that is, compounds of the formula R—CO—(OC$_2$H$_4$)$_n$—OH wherein R—CO is the acyl radical of a fat acid such as lauric, palmitic, oleic, stearic, etc. and $n$ has a value from 6 to 60.

Condensation products of ethylene oxide with long-chain aliphatic alcohols, i.e., compounds of the formula R—(OC$_2$H$_4$)$_n$—OH wherein R is the hydrocarbon radical of a long-chain alcohol such as dodecyl, tetradecyl, hexadecyl, octadecyl, oleyl, etc., and $n$ has a value from 6 to 60.

Mono- or di-esters of sucrose and fatty acids containing at least six carbon atoms. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, and the like.

Monoglycerides of higher fatty acids, for example, glycerol monolaurate, glycerol monomyristate, glycerol monopalmitate, glycerol monostearate, glycerol monooleate.

Salts of higher fatty acids, for example sodium palmitate, sodium stearate, sodium oleate, or mixtures thereof.

Higher alkyl sulphates, as for example, sodium dodecyl sulphate, sodium tetradecyl sulphate, sodium hexadecyl sulphate, sodium octadecyl sulphate, sodium oleyl sulphate.

Higher alkyl sulphonates, e.g., sodium dodecane sulphonate, sodium tetradecane sulphonate, sodium hexadecane sulphonate, sodium octadecane sulphonate, sodium oleyl sulphonate.

Alkylaryl sulphonates such as the sodium alkyl (C$_8$-C$_{20}$) benzene sulphonates. Typical in this case are sodium dodecyl benzene sulphonate and sodium hexadecyl benzene sulphonate.

Alkyl esters of sulphosuccinic acid, for example, the sodium salts of dioctyl sulphosuccinate, dihexylsulphosuccinate, etc.

Sulphonated or sulphated fatty acid esters or amides, i.e., compounds of the types:

RCO—O—CH$_2$—CH$_2$—SO$_3$Na
RCO—NH—CH$_2$—CH$_2$—SO$_3$Na
RCO—O—CH$_2$—CH$_2$—OSO$_3$Na
RCO—NH—CH$_2$—CH$_2$—OSO$_3$Na wherein RCO— represents the acyl radical of a long-chain fatty acid such as lauric, myristic, palmitic, stearic, oleic, etc.

Condensates of ethylene oxide and alkyl phenols, that is, compounds of the type R—C$_6$H$_4$—(OC$_2$H$_4$)$_n$—OH wherein R represents an alkyl radical containing 6 to 20 carbon atoms and $n$ has a value of about 6 to 30.

It will of course be appreciated that the particular emulsifying agent for use in the process of the invention will be selected according to the use which is to be made of the final product. Thus where the product is intended for edible purposes, the emulsifying agent selected will be one which is edible or at least which may be ingested without adverse effects. Thus for the production of edible products, I prefer to use emulsifying agents of the class of sucrose mono- or di-esters with higher fatty acids; agents of the class of glycerol monoesters of higher fatty acids; agents of the class of polyoxyethylene derivatives of higher fatty acids, e.g., polyoxyethylene monostearate; agents of the class of sorbitan fatty acid esters or polyoxyethylene sorbitan fatty acid esters; salts of higher fatty acids, e.g., sodium oleate; and the like.

Preparation of the rice in a partially cooked state may be accomplished essentially as described in the aforesaid Roberts patent. A suitable amount of white rice is first soaked in water. Usually water at about room temperature is used for convenience although the water may be warmed to accelerate hydration of the grains. Thus the temperature of soaking may be from about 20° C. to about 60° C. Generally the soaking is carried out for about 30–60 minutes, the aim being to increase the moisture content of grains to the equilibrium amount, that is, about 30% The soaked rice is then subjected to a partial cooking operation by contact with boiling water or steam, the former being preferred. The purpose of this partial cooking is to partially gelatinize the starch in the rice grains so that their moisture content can be increased above the level obtained in the soaking operation. It is critical that the conditions of this cooking operation be restricted so that the grains contain not more than about 45 to 60% water, preferably the grains should contain about 55% water. The duration of cooking will vary depending on such factors as the variety of rice used, the temperature of the cooking medium, etc. For example, with a short-grained rice such as Pearl, a 1 to 2 minute boiling will be adequate whereas with a long-grain rice such as Patna, a 3 to 4 minute boiling will be required. If the cooking is carried out in hot water below the boiling point longer cooking times would be required. In any particular case, pilot operations can be carried out on small samples of the variety in question to determine the time of cooking required to attain a moisture level of 45–60% at the temperature selected for the cooking operation. It is to be observed that at this moisture level the grains are not cooked to an edible state; to get to an edible state a moisture content of 65–75% is required. Thus the partially cooked grains have soft exteriors but their centers are still somewhat hard and raw. In this condition the rice can be subjected to a subsequent heat processing step (required for sterilization) without forming a pasty mass; completely cooked rice under these conditions would form a pasty product of no practical value. If desired, the soaking step may be eliminated and the raw white rice directly cooked in water. In this case it is likewise essential that the grains be cooked only to the point where they contain 45 to 60%, preferably 55%, of water. The time of cooking will depend on the variety of rice and the temperature of the cooking medium. In general, the proper degree of moisture content is attained by boiling the rice about 4 to 10 minutes.

For best results, the water used for soaking and cooking the rice should be neutral or somewhat acidic, thus its pH should be about from 5 to 7. Alkaline waters as encountered in some areas tend to cause a yellowing of the canned rice. Thus it is preferred to check the pH of the water supply. If it exhibits an alkaline reaction, a suitable amount of edible acid is added to bring it to the pH range indicated. Acetic acid or phosphoric acid are preferred for this purpose. For similar reasons, it is preferred that the emulsion applied to the rice be free from alkalinity. Thus when the emulsion is prepared its pH may be tested and where necessary brought to the above range. For this purpose one may employ any edible acid such as acetic, citric, phosphoric, malic, tartaric, or the like.

After application of the emulsion to the partially cooked rice as described above, the emulsion-coated rice is packed into cans and the cans sealed, preferably under high vacuum, that is, a vacuum 27 or more inches of mercury. The advantage of sealing under high vacuum whereby to prevent discoloration of the rice in the cans is explained at length in the Roberts patent. After sealing, the cans are subjected to a retorting or autoclaving operation to sterilize the contents and insides of the cans. This operation is carried out in the same manner as is common to all vegetable canning operations and requires that the cans be subjected to steam under superatmospheric pressure for a sufficient period of time to insure destruction of microorganisms and spores. For example with cans up to 3 inches in diameter one may apply a temperature of 240° F. for 60 minues. In general, temperatures of 220–270° F. applied for times of 30 to 120 minutes may be used depending on the size of the cans.

The canned rice product prepared in accordance with the invention is of superior quality measured by all significant criteria. In color it is brilliant white comparable to the best quality freshly cooked rice. In flavor and texture it is virtually indistinguishable from best quality freshly cooked rice. In regard to separation of grains it is superior to best quality freshly cooked rice and superior in this regard to the products produced by the Roberts Patent 2,686,130.

To prepare the canned rice product for the table, the can is opened and the contents immersed in boiling water for not more than one minute, then drained. The rice is then ready to eat; no cooking is required.

In the preferred modification of the invention, white rice is prepared in a partially cooked condition, coated with the emulsion, and canned. Best results, i.e., minimum stickiness, is attained with this modification. However, it is within the purview of the invention though yielding less desirable results, to coat the rice with the emulsion at other stages prior to canning. Thus, for example, the emulsion may be applied to the rice in the cooking step. To this end, the rice (soaked or unsoaked) is cooked in a bath of the emulsion instead of in plain water. The cooking is otherwise conducted as previously described. Moreover, the emulsion may be applied to the rice at more than one stage in the processing. Thus the emulsion may be applied in any combination of two or more stages as in the soaking stage, during cooking, or after cooking. Although all these alternatives are contemplated, for best results the emulsion is applied to the rice after the cooking stage and little extra benefits are gained by applying it at additional stages in the process. Procedures embodying these alternative techniques are illustrated in Example III, below.

The invention is further demonstrated by the following illustrative examples. For comparison purposes, procedures outside the scope of the invention are included.

EXAMPLE I

A series of canned rice products were prepared from a single batch of raw white rice employing the following procedures:

A. Process according to this invention

Twelve hundred grams of white rice was soaked for 30 minutes at room temperature in 1000 ml. of water adjusted to a pH of 5–5.5 by addition of acetic acid. The soaked rice was rinsed in tap water, drained, placed in 3500 ml. of boiling water (pH adjusted to 5–5.5 with acetic acid) and cooked on the steam bath for about 5 minutes until the moisture content of the rice was 50%. The partially cooked rice was then immersed in 3500 ml. of aqueous oil emulsion and drained on a screen. Composition of the emulsion was: 5% cottonseed oil; 0.5% "Tween 60" (polyoxyethylene sorbitan monostearate); the remainder water. Sufficient acetic acid was added to the emulsion to bring its pH to the level 5–5.5. The coated, partially cooked rice was then packed in 303 x 406 enamel-lined cansfi using 336 grams of rice per can. The cans were sealed under a vacuum of 28 inches of mercury, retorted 60 min. at 240° F. and cooled in tap water.

B. Process without emulsion coating

Another batch of the same white rice was canned as set forth in section A, above, with the exception that the step of coating the rice with the emulsion was omitted.

C. Coating with oil

Another batch of the same white rice was canned in accordance with the procedure set forth in section A, above, with the exception that the step of coating the rice with the emulsion was omitted. Instead, the partially cooked rice was immersed in a mechanical dispersion of 5% cottonseed oil in water, then drained thoroughly. The oil dispersion was prepared by strongly agitating the oil with water adjusted to a pH of 5–5.5 with acetic acid. After coating the rice with the oil-water dispersion, the coated rice was canned as described in section A.

D. Coating with oil in alcohol

Another batch of the same white rice was canned in accordance with the procedure of section A, above, with the exception that the step of coating the rice with the emulsion was omitted. Instead the partially coated rice was immersed in a 5% solution of cottonseed oil in absolute ethanol, then drained thoroughly. The rice, coated with the oil-alcohol solution, was then canned as set forth in section A.

The four lots of canned rice were allowed to stand seven days at room temperature. The cans were then opened and the products observed, tasted, and tested for grain separation. The degree of separation of the grains was determined as follows:

Both ends of the can are removed and the mass of rice pushed out onto the top of a shaker screen. This screen is a metal plate having 3/16" holes on 1/4" centers in staggered rows. The screen is shaken for two minutes on a reciprocating table with a stroke of one inch at a speed of 335 strokes per minute. The rice that passes through the screen is collected and weighed. The degree of grain separation is then calculated by dividing this weight by the weight of rice originally placed on the screen and multiplying by 100 to put it on a percentage basis. It is evident that the higher the degree of grain separation the better the product as the grains exhibit less tendency to stick together.

The results obtained in the four runs are tabulated below:

| Run | Coating material | Color of product | Taste of product | Degree of grain separation, percent |
|---|---|---|---|---|
| A | oil emulsion | white | excellent | 91 |
| B | none used | do | do | 25 |
| C | oil in water | yellow | poor, has off-flavor | 65 |
| D | oil in alcohol | do | bitter | 55 |

It was also observed that in product C, there were droplets of oil visible on the rice grains and on the inside walls of the can. No such objectionable factors were observed with product A.

EXAMPLE II

Two lots of the same white rice were canned as set forth in Example I, section A, with the following exceptions: In run 1, the amount of cottonseed oil in the emulsion was 3%; in run 2 the amount of cottonseed oil in the emulsion was 4%.

The canned products had a white color and excellent flavor. Data on grain separation are set forth below:

| Run | Amount of oil in emulsion, percent | Degree of grain separation, percent |
|---|---|---|
| 1 | 3 | 67 |
| 2 | 4 | 82 |

EXAMPLE III

A series of canned rice products were prepared from a single batch of raw white rice, California Pearl variety, employing the following procedure for each run—

Twelve hundred grams of rice were soaked for 30 minutes at room temperature in 1,000 ml. of water or emulsion. Soaking in water was used in runs 2, 3, 5, and 6; soaking in emulsion was used in runs 1 and 4.

The soaked rice was rinsed with tap water, drained, then cooked in 3,500 ml. of boiling water or emulsion, as specified below. Cooking time was 5 minutes and the moisture content of the partially cooked rice was 50%. In runs 3 and 6 the cooking was in water; in runs 1, 2, 4, and 5 the cooking was in the emulsion.

The partially cooked rice was rinsed with water (runs 4, 5, and 6) or coated with the emulsion (runs 1, 2, and 3). In the latter case the coating was performed as described in Example I, part A.

The rice was then packed in 303 x 406 enamel-lined cans, using 336 grams of rice per can. The cans were sealed under a vacuum of 28 inches of mercury, retorted 60 minutes at 240° F., and cooled in tap water.

The emulsion used in these experiments, whether for soaking, cooking, or coating after cooking, contained 5% cottonseed oil, 0.5% "Tween-60" (polyoxyethylene sorbitan monostearate), the remainder water. The water used in soaking and cooking and the emulsions were adjusted to pH 5-5.5 by addition of acetic acid.

The canned products were allowed to stand a week at room temperature then were tested for grain separation as described above.

The materials used in the various steps and the results obtained are tabulated below:

| Run | Soaking medium | Cooking medium | Application of emulsion after cooking | Degree of grain separation, percent |
| --- | --- | --- | --- | --- |
| 1 | emulsion | emulsion | yes | 89 |
| 2 | water | do | yes | 89 |
| 3 | do | water | yes | 84 |
| 4 | emulsion | emulsion | no | 57 |
| 5 | water | do | no | 45 |
| 6 (control) | do | water | no | 26 |

Having thus described my invention, I claim:

1. In the process of canning rice wherein white rice is partially cooked until its moisture content is about from 45 to 60%, the partially cooked rice is filled into containers, the containers are sealed and subjected to a heat-processing operation to sterilize the contents and the insides of the containers, the improvement which comprises coating the rice, prior to filling it into the containers, with a stable aqueous emulsion containing at least about 1% by weight of an edible oil and an emulsifying agent whereby the canned product exhibits minimum stickiness.

2. A process for canning white rice which comprises soaking white rice in water, partially cooking the soaked rice until its moisture content is about from 45 to 60%, coating the partially cooked rice with a stable aqueous emulsion containing at least about 1% by weight of an edible oil and an emulsifying agent, filling the coated, partially cooked rice into containers, sealing the containers under vacuum, and subjecting the sealed containers to a heat-processing operation to sterilize the contents and insides of the containers.

References Cited in the file of this patent

UNITED STATES PATENTS 2,686,130   Roberts _____ Aug. 10, 1954